United States Patent
Mao

(10) Patent No.: US 9,762,169 B1
(45) Date of Patent: Sep. 12, 2017

(54) LINEAR MOTOR SYSTEM

(71) Applicant: Lubin Mao, Shenzhen (CN)

(72) Inventor: Lubin Mao, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 0 days.

(21) Appl. No.: 15/412,088

(22) Filed: Jan. 23, 2017

(30) Foreign Application Priority Data

Jun. 14, 2016 (CN) .......................... 2016 1 0415316

(51) Int. Cl.
| | |
|---|---|
| *H02K 41/00* | (2006.01) |
| *H02P 1/00* | (2006.01) |
| *H02P 3/00* | (2006.01) |
| *H02P 25/06* | (2016.01) |
| *H02K 11/33* | (2016.01) |
| *B06B 1/02* | (2006.01) |
| *H02K 33/04* | (2006.01) |

(52) U.S. Cl.
CPC ............ *H02P 25/06* (2013.01); *B06B 1/0238* (2013.01); *H02K 11/33* (2016.01); *H02K 33/04* (2013.01); *H02K 2213/03* (2013.01)

(58) Field of Classification Search
CPC .................................. H02P 25/06; H02K 11/33
USPC ........................................................ 318/135
See application file for complete search history.

(56) References Cited

U.S. PATENT DOCUMENTS

| | | | |
|---|---|---|---|
| 2015/0054808 A1* | 2/2015 | Kamata ................. | G06F 1/1626 345/208 |
| 2016/0031286 A1* | 2/2016 | Kubota ................... | B60G 17/08 701/37 |
| 2016/0239089 A1* | 8/2016 | Taninaka ................... | B06B 1/06 |
| 2017/0009762 A1* | 1/2017 | Lilie ....................... | F04B 35/04 |
| 2017/0012518 A1* | 1/2017 | Wang ...................... | H02K 33/16 |

* cited by examiner

*Primary Examiner* — Erick Glass
(74) *Attorney, Agent, or Firm* — Na Xu; IPro, PLLC

(57) ABSTRACT

The present disclosure discloses a linear motor system. The system includes a linear motor and a drive module which drives the linear motor to vibrate. The linear motor includes a housing having an accommodating space, a vibrating module accommodated in the accommodating space and an elastic part for supporting the vibrating module in the accommodating space elastically. The drive module includes a drive unit for driving the vibrating module to vibrate and a tuning unit for regulating the resonant frequency of the vibrating module. Moreover, the linear motor system of the present disclosure can meet vibration requirements of various application programs and scenes.

6 Claims, 5 Drawing Sheets

LINEAR MOTOR SYSTEM

FIELD OF THE INVENTION

The invention is related to the technology of vibrators, and especially relates to a linear motor for providing tactile feedbacks.

DESCRIPTION OF RELATED ART

The portable consumer electronic products are favored by more and more people along with development of the electronic technologies, such as mobile phone, handheld game player, navigation unit or handheld multimedia entertainment equipment, etc. The vibration feedback, which is taken as one feedback form of the portable consumer electronic product, has been extended to provide the tactile feedback related to application program and scene, etc. gradually from the initial and most fundamental coming call prompt, etc. While the motor is the primary element offering vibration feedback in the mobile equipment and usually comprises a rotary motor, a piezoelectric motor, a linear motor, etc., wherein the linear motor has the absolute advantage on the aspect of offering the tactile feedback related to the application program and the scene due to its small volume, long service life, low power dissipation, rapid response, etc.

The fundamental working principle of the linear motor is to drive the vibrating mass to vibrate by using the ampere force which is applied to the electrified coils in the magnetic field. In relevant technologies, the resonant frequency of the vibrating mass in the linear motor is the inherent frequency and determined by the elastic coefficient and mass of the vibrating system; while the elastic coefficient and the mass are determined upon completion of the product and cannot be changed; therefore, the resonant frequency of the linear motor is single and cannot be adjusted, and cannot meet the requirements thereof in different application scenes.

Therefore, it is necessary to provide an improved linear motor to overcome above disadvantage.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENTS

The present invention will hereinafter be described in detail with reference to exemplary embodiment. To make the technical problems to be solved, technical solutions and beneficial effects of present disclosure more apparent, the present disclosure is described in further detail together with the figures and the embodiment. It should be understood the specific embodiment described hereby are only to explain this disclosure, not intended to limit this disclosure.

Figure 1:
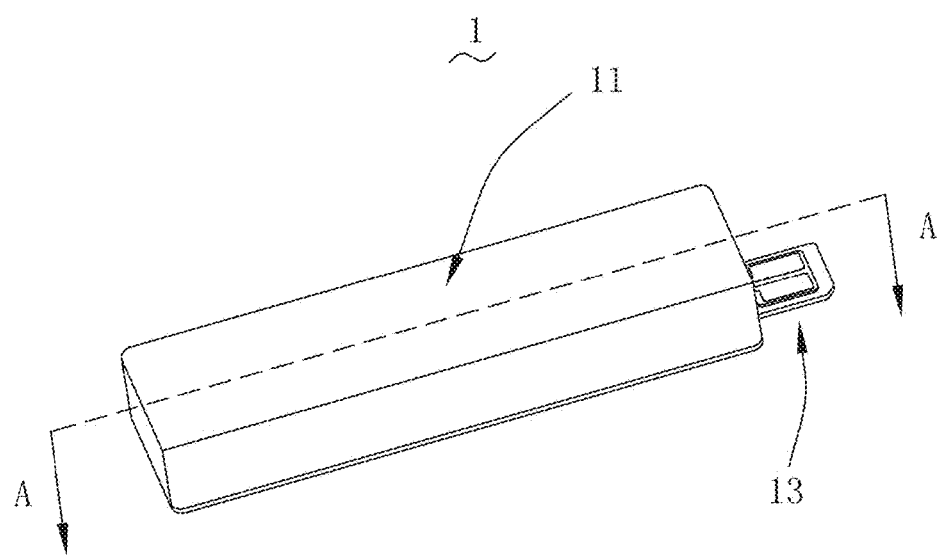
FIG. 1 is an isometric view of a linear motor in accordance with a first embodiment of the present disclosure.
Figure 2:
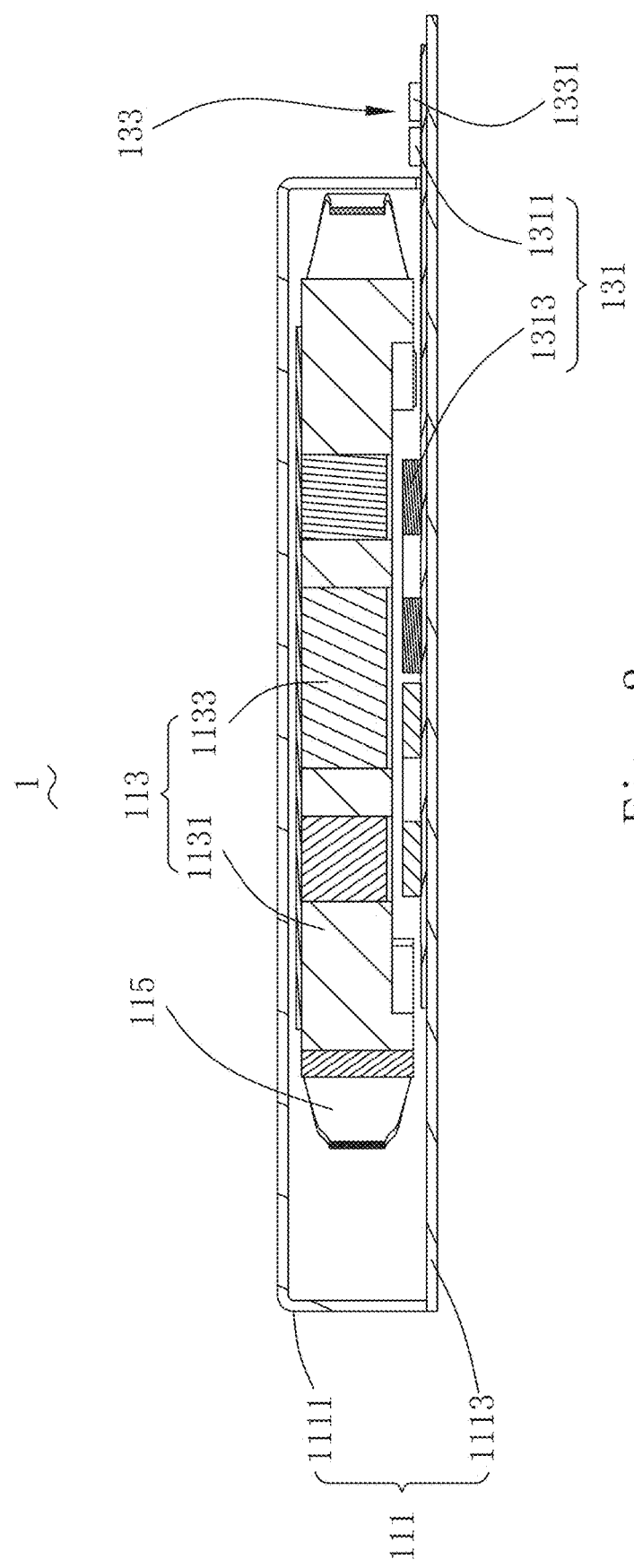
FIG. 2 is a cross-sectional view of the linear motor taken along line A-A in FIG. 1.

Referring to FIGS. 1-2, a linear motor system 1 in accordance with a first embodiment of the present disclosure comprises a linear motor 11 and a drive module 13 for driving the linear motor 11 to vibrate. At this time, the resonant frequency of the linear motor system 1 is taken as the first resonant frequency. Moreover, the resonant frequency of the linear motor system 1 after adjustment shall be taken as the second resonant frequency.

The linear motor 11 comprises a housing 111 having an accommodating space, a vibrating module 113 which is accommodated in the accommodating space and elastic part 115 supported in the accommodating space elastically. Two elastic parts 115 are arranged on two ends of the vibrating module 113 in the vibrating direction respectively in order to slow down impact and protect the vibrating module 113 when the vibrating module 113 vibrates.

The housing 111 comprises a substrate 1111 and a cover plate 1113 covering the substrate 1111; and the cover plate 1113 and the substrate 1111 are matched and engaged with each other jointly to form the accommodating space.

The vibrating module 113 comprises a weight 1131 and a vibrating magnet 1133 which is embedded on the weight 1131; and one end of the elastic part 115 is connected with the weight 1131, and the other end thereof is connected with the housing 111.

The drive module 13 comprises a drive unit 131 driving the vibrating module 113 to vibrate and a tuning unit 133 for regulating the resonant frequency of the vibrating module 113. The drive signal refers to the harmonic signal and is in line with the following formula: $mx''+cx'+kx=F_0 \cos \omega t$; the tuning unit 133 generates the regulating signals which are in line with the following formula: $F'=k' x$; at this time, the vibration equation of the linear motor system 1 is $mx''+cx'+kx=F_0 \cos \omega't+F'$; the formula can be deduced according to the above-mentioned formula:

$$\omega' = \sqrt{\frac{k-k'}{m}},$$

after learning from which the regulating signal added is equivalent to change the whole spring constant of the vibrating module 113; therefore, the resonant frequency of the vibrating module 113 is changed, and the adjustable function of the resonant frequency can be implemented. $k'=k-\omega'^2 m$ can be deduced according to the above-mentioned formula; and k' can be acquired after determining the second resonant frequency $\omega'$ because k and m are known factors; then the ampere force F' of the adjusting signal can be acquired in accordance with the regulating signal formula, wherein m is the mass of the vibrating module;

C is the damping coefficient of the vibrating module;

k and k' correspond to the spring constant of the vibrating module and the spring constant for change of the regulating signal respectively;

$\omega$ and $\omega'$ correspond to the first resonant frequency and the second resonant frequency respectively.

$F_0$ and F' correspond to the ampere force which is applied to the vibrating module when the resonant frequency is the first resonant frequency and the ampere force which is applied to the vibrating module when the resonant frequency is the one converted as the second resonant frequency from the first resonant frequency, respectively;

x, x', and x" correspond to the resonant displacement, the first derivative and the second derivative of the resonant displacement respectively.

The drive unit 131 comprises a drive signal generator 1311 for generating the drive signal and drive coils 1313 for receiving the drive signal and driving the vibrating module 113 to vibrate. The drive coils 1313 are accommodated in the accommodating space and are arranged opposite to the vibrating magnet 1133 at interval, specifically the drive coils 1313 drive the vibrating magnet 1133 to vibrate; the weight 1131 and the elastic part 115 are driven to vibrate jointly when the vibrating magnet 1133 vibrates, in order to implement the integral vibration of the vibrating module 113. The resonant frequency of the vibrating module 113 is determined by the ratio of the elastic coefficient of the elastic part 115 to the weight 1131. Moreover, the resonant frequency of the vibrating module 113 has nothing to do with the drive signal.

The tuning unit 133 comprises a first signal generator 1331 for generating the regulating signal, wherein the regulating signal is determined by the ampere force and is the adjustable signal; and the resonant frequency of the vibrating module 113 can be adjusted by superposition on the drive signals.

Figure 3:
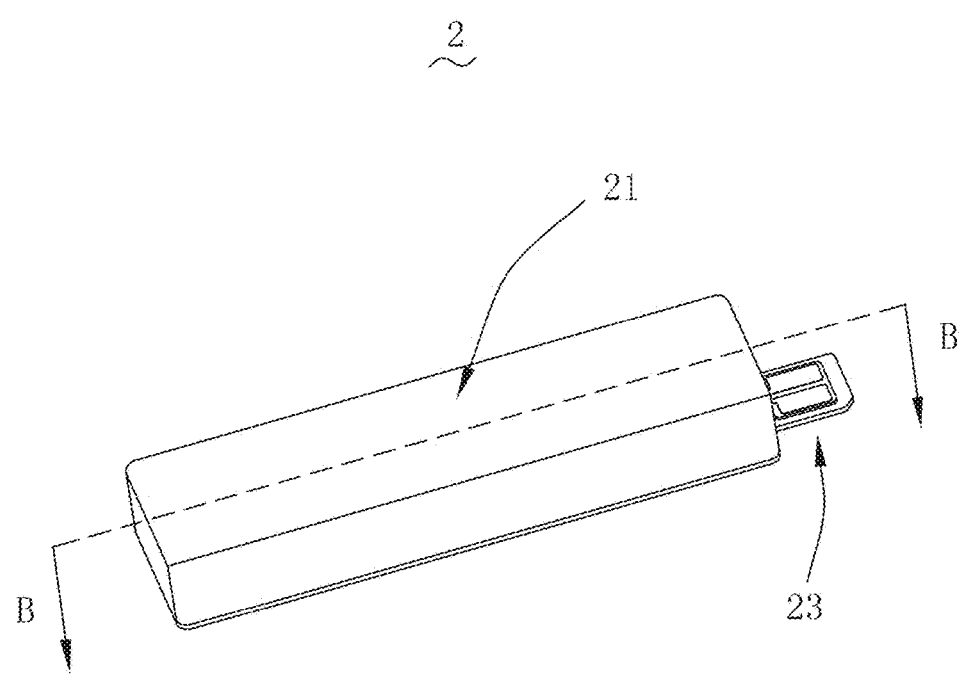
FIG. 3 is an isometric view of a linear motor in accordance with a second embodiment of the present disclosure.
Figure 4:
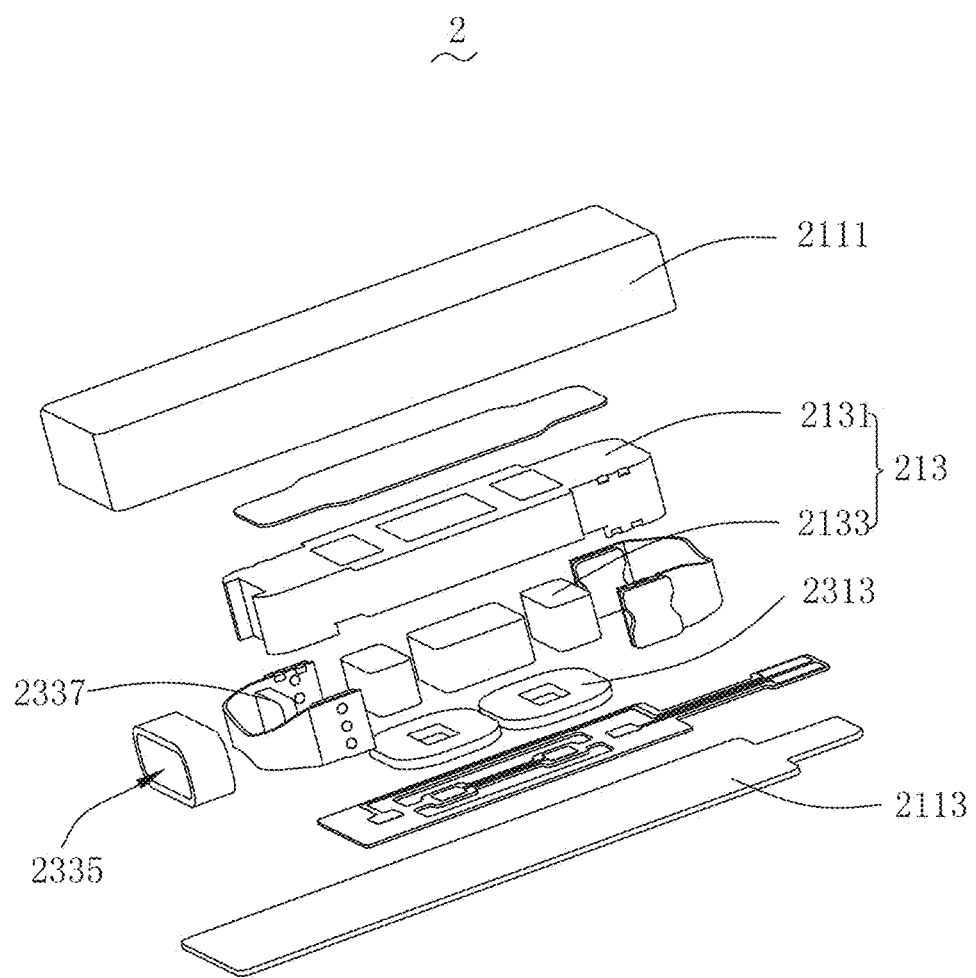
FIG. 4 is an exploded view of the linear motor in FIG. 3.
Figure 5:
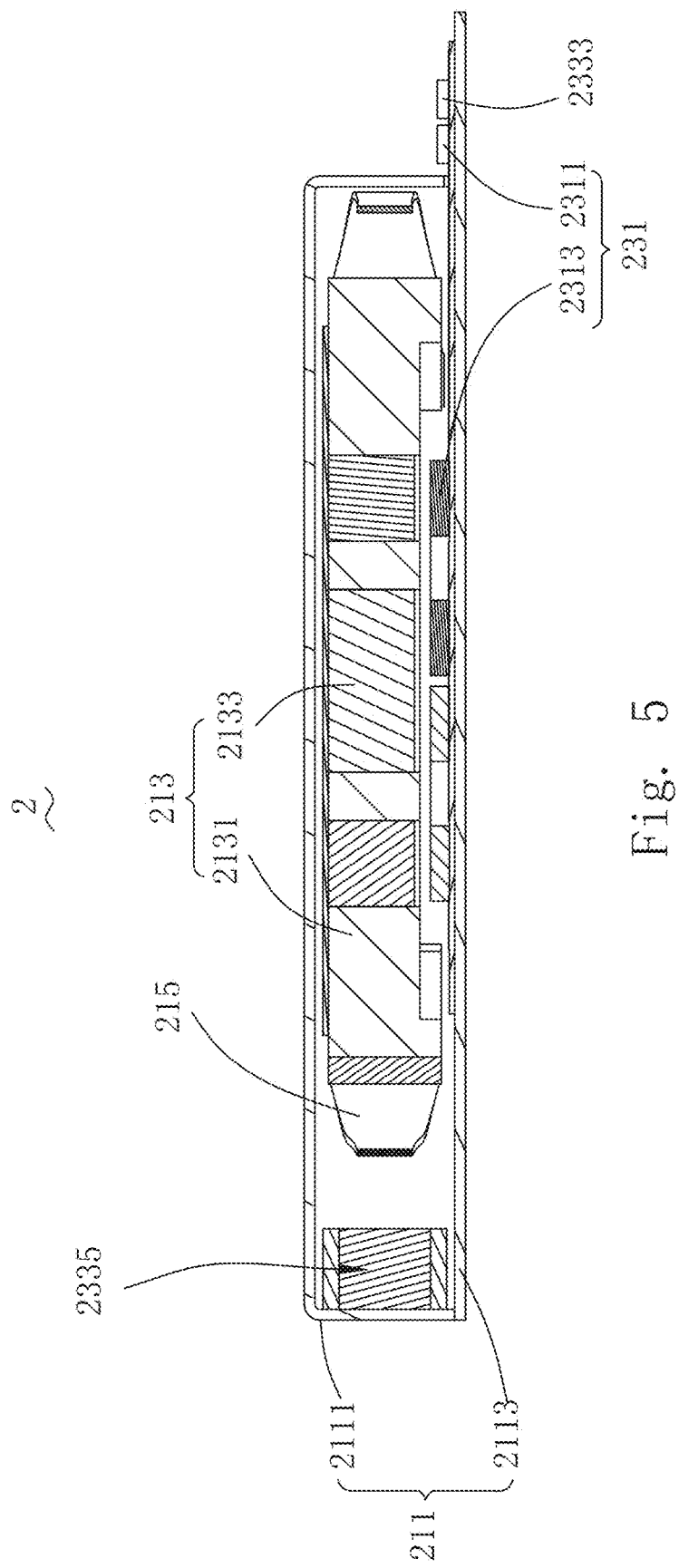
FIG. 5 is a cross-sectional view of the linear motor taken along line B-B in FIG. 3.

Please refer to FIGS. 3-5, a linear motor system 2 in accordance with a second exemplary embodiment comprises a linear motor 21 and a drive module 23 for driving the linear motor 21 to vibrate. At this time, the resonant frequency of the linear motor system 2 is taken as the first resonant frequency. Moreover, the resonant frequency of the linear motor system 2 after adjustment shall be taken as the second resonant frequency.

The linear motor 21 comprises a housing 211 having the accommodating space, a vibrating module 213 which is accommodated in the accommodating space and elastic parts 215 supported in the accommodating space elastically. Two elastic parts 215 are arranged on two ends of the vibrating module 213 in the vibrating direction respectively in order to slow down impact and protect the vibrating module 213 when the vibrating module 213 vibrates.

The housing 211 comprises a substrate 2111 and a cover plate 2113 covering the substrate 2111; and the cover plate 2113 and the substrate 2111 are matched and engaged with each other jointly to form the accommodating space.

The vibrating module 213 comprises a weight 2131 and a vibrating magnet 2133 which is embedded on the weight 2131; and one end of the elastic part 215 is connected with the weight 2131, and the other end thereof is connected with the housing 211.

The drive module 23 comprises a drive unit 231 driving the vibrating module 213 to vibrate and a tuning unit 233 for regulating the resonant frequency of the vibrating module 213. The drive signal refers to the harmonic signal, and meets the following formula: $mx''+cx'+kx=F_0 \cos \omega t$; the tuning unit 233 generates the regulating signals which are in line with the following formula: $F'=k' x$; at this time, the vibration equation of the linear motor system 2 is: $mx''+cx'+kx=F_0 \cos \omega' t+F'$. It can be deduced according to above mentioned formula:

$$\omega' = \sqrt{\frac{k-k'}{m}},$$

after learning from which the regulating signal added is equivalent to change the whole spring constant of the vibrating module 213; therefore, the resonant frequency of the vibrating module 213 is changed, and the adjustable function of the resonant frequency can be implemented. It can be deduced according to above mentioned formula: $k'=k-\omega'^2 m$, and k' can be acquired after determining the second resonant frequency $\omega'$ because k and m are known factors; then the ampere force F' of the adjusting signal can be acquired in accordance with the regulating signal formula.

The drive unit 231 comprises a drive signal generator 2311 for generating the drive signal and drive coils 2313 for receiving the drive signal and driving the vibrating module 213 to vibrate. The drive coils 2313 are accommodated in the accommodating space and are arranged opposite to the vibrating magnet 2133 at interval, specifically the drive coils 2313 drive the vibrating magnet 2133 to vibrate; the weight 2131 and the elastic part 215 are driven to vibrate jointly when the vibrating magnet 2133 vibrates in order to implement the integral vibration of the vibrating module 213. The resonant frequency of the vibrating module 213 is determined by the ratio of the elastic coefficient of the elastic part 215 to the weight 2131. Moreover, the resonant frequency of the vibrating module 213 has nothing to do with the drive signal.

The tuning unit 233 comprises a second signal generator 2333 for generating the regulating signal, an electromagnet 2335 and a tuning magnet 2337 arranged in the vibrating direction of the vibrating module 213. The tuning magnet 233 is fixed on one end of the vibrating module 213 and is arranged opposite to the electromagnet 2335. The second signal generator 2333 generates the regulating signal and sends the regulating signal to the electromagnet 2335 to make the electromagnet 2335 generate electromagnetic field. The resonant frequency of the tuning magnet 2337 can be changed by applying the ampere force to the tuning magnet 2337 in the electromagnetic field. Moreover, the resonant frequency of the tuning magnet 2337 is identical to that of the vibrating module 213.

The beneficial effects of the present disclosure are as follows: one linear motor is provided in order to implement the adjustable resonant frequency of the linear motor by providing the drive unit to drive the vibrating module to vibrate and combining with the tuning unit to adjust the resonant frequency of the vibrating module; therefore, the linear motor can meet the vibration requirements of difference application programs and scenes and the application path of the linear motor is expanded greatly.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:
1. A linear motor system comprising:
 a linear motor including a housing having an accommodating space, a vibrating module accommodated in the accommodating space and an elastic part for supporting the vibrating module in the accommodating space elastically;

a drive module driving the linear motor to vibrate, the drive module including a drive unit for driving the vibrating module to vibrate and a tuning unit for regulating the resonant frequency of the vibrating module; wherein the tuning unit generates regulating signals which are in line with the following formula: $F'=k'x$; at this time, the vibration equation of the linear motor system is: $mx''+cx'+kx=F_0 \cos \omega't+F'$; therefore, the formula can be deduced according to the above-mentioned formula, where m is the mass of the vibrating module;

C is the damping coefficient of the vibrating module;

k and k' correspond to the spring constant of the vibrating module and the spring constant changed by the regulating signal respectively;

$\omega'$ is the resonant frequency of the vibrating module when the spring constant of the vibrating module is changed;

$F_0$ and F' correspond to the ampere force which is applied to the vibrating module before the spring constant of the vibrating module is changed and the ampere force which is applied to the vibrating module when the spring constant of the vibrating module is changed respectively;

x, x' and x" correspond to the resonant displacement, the first derivative and the second derivative of the resonant displacement respectively.

2. The linear motor system as described in claim 1, wherein the tuning unit serves as a first signal generator which generates the regulating signal and sends the regulating signal to the drive unit.

3. The linear motor system as described in claim 1, wherein the tuning unit comprises a second signal generator, an electromagnet and a tuning magnet which are arranged in the vibrating direction of the vibrating module; the tuning magnet is fixed on one end of the vibrating module and arranged opposite to the electromagnet; the second signal generator generates the regulating signal and sends the regulating signal to the electromagnet; and the resonant frequency of the tuning magnet would be changed by the electromagnetic field generated by the electromagnet.

4. The linear motor system as described in claim 3, wherein drive signal refers to a harmonic signal.

5. The linear motor system as described in claim 3, wherein the vibrating module comprises a weight and a vibrating magnet which is embedded in the weight; and one end of the elastic part is connected with the weight, and the other end thereof is connected with the housing.

6. The linear motor system as described in claim 3, wherein two elastic parts are arranged on two sides of the vibrating module in the vibrating direction, respectively.

* * * * *